(12) United States Patent
Huston et al.

(10) Patent No.: US 7,569,774 B2
(45) Date of Patent: Aug. 4, 2009

(54) SELF-HEALING CABLE FOR EXTREME ENVIRONMENTS

(75) Inventors: Dryver R. Huston, S. Burlington, VT (US); Bernard R. Tolmie, Grand Isle, VT (US)

(73) Assignee: University of Vermont and State Agricultural College, Burlington, VT (US)

( * ) Notice: Subject to any disclaimer, the term of this patent is extended or adjusted under 35 U.S.C. 154(b) by 0 days.

(21) Appl. No.: 11/803,430

(22) Filed: May 15, 2007

(65) Prior Publication Data

US 2008/0283272 A1    Nov. 20, 2008

(51) Int. Cl.
*H01B 7/00* (2006.01)
(52) U.S. Cl. .................................. 174/120 R
(58) Field of Classification Search ............. 174/120 R, 174/107, 110 F
See application file for complete search history.

(56) References Cited

U.S. PATENT DOCUMENTS

| | | | | |
|---|---|---|---|---|
| 4,145,567 A | * | 3/1979 | Bahder et al. ............... | 174/107 |
| 4,270,961 A | * | 6/1981 | Faranetta et al. ............... | 156/51 |
| 4,468,435 A | * | 8/1984 | Shimba et al. ............... | 428/383 |

* cited by examiner

*Primary Examiner*—Chau N Nguyen
(74) *Attorney, Agent, or Firm*—Opticus IP Law PLLC (57) ABSTRACT

Self-healing cable apparatus and methods disclosed. The self-healing cable has a central core surrounded by an adaptive cover that can extend over the entire length of the self-healing cable or just one or more portions of the self-healing cable. The adaptive cover includes an axially and/or radially compressible-expandable (C/E) foam layer that maintains its properties over a wide range of environmental conditions. A tape layer surrounds the C/E layer and is applied so that it surrounds and axially and/or radially compresses the C/E layer. When the self-healing cable is subjected to a damaging force that causes a breach in the outer jacket and the tape layer, the corresponding localized axially and/or radially compressed portion of the C/E foam layer expands into the breach to form a corresponding localized self-healed region. The self-healing cable is manufacturable with present-day commercial self-healing cable manufacturing tools.

20 Claims, 9 Drawing Sheets

SELF-HEALING CABLE FOR EXTREME ENVIRONMENTS

STATEMENT OF GOVERNMENTAL SUPPORT

This invention was made in part with U.S. Government support under Cooperative Agreement No. NCC5-581 by Vermont's NASA EPSCoR Program and under NSF EPS Grant No. 0236976 by Vermont's NSF EPSCoR Program. The U.S. Government therefore has certain rights in this invention.

CROSS-REFERENCE TO RELATED APPLICATIONS

This application is related to U.S. patent application Ser. No. 11/362,611, entitled "Self-healing cable apparatus and methods," filed on Feb. 27, 2006, which patent has a common inventor and assignee as the present application, and which patent application is incorporated by reference herein.

BACKGROUND OF THE INVENTION

1. Field of the Invention

The present invention relates generally to self-healing cables for a variety of applications (e.g., electrical, optical, fluid, gas, etc.), and particularly to self-healing cables for extreme environments.

2. Technical Background

Self-healing cable failures are a major concern in high-performance engineered systems such as cars, airplanes, boats, submarines, spacecraft, nuclear power plants, buildings, etc. For example, cabling problems on commercial and military aircraft have been implicated as the cause of accidents. Self-healing cable failures can occur for a number of reasons, such as the result of physical chafing, vibration, and wires in bundles rubbing against each other. These actions are examples of damaging forces that can cause a self-healing cable to become cracked and broken, and in the case of electrical wiring may cause shorts, sparks, incorrect signals, fire, and arcing, among many other possible electrical failures.

Even though self-healing cable failure poses a significant safety hazard in many different applications, self-healing cable inspection and repair remains difficult and expensive. Hidden self-healing cable damage is difficult to locate, and the self-healing cable inspection process itself can itself cause self-healing cable damage. Self-healing cable replacement is often quicker than diagnosis and repair.

Of particular concern is self-healing cable failure in extreme environments, i.e., environments that experience extremes in one or more environmental characteristics, such temperature, pressure, and acceleration (particularly vibration). Such extreme environments occur, for example, in aviation and aeronautical applications. Not only does an extreme environment exacerbate self-healing cable failure issues, it also prevents most types of self-healing cables developed for use the utility and construction industries from operating properly. For example, U.S. Patent Publication No. US2005/0136257 to Easter discloses a self-healing cable that has a water-swellable composition surrounding a conductor. When the self-healing cable is damaged, the water-swellable material reacts with water and seals the breach in the self-healing cable. However, this approach will not work in an extreme environment wherein the temperature can swing below the freezing point of water. Nor will it work in an environment where liquid water is absent.

Another issue related to cabling used in extreme environments is that such cabling needs to satisfy higher design standards and specifications. For example, aviation and aerospace cabling needs to satisfy U.S. Military Specification No. 22759, which has a variety of requirements, such for temperature (down to −55° C.), extreme bending, dielectric strength, etc. Thus, any self-healing cable used in an extreme environment needs to perform at or near such stringent requirements. The prior art self-healing cables are typically suitable for select environments that do not experience a wide variation in environmental conditions experienced in extreme environments and so are unsuitable for extreme environment applications.

SUMMARY OF THE INVENTION

An aspect of the present invention is a self-healing cable apparatus that includes at least one conductor and an axially and/or radially compressible/expandable (C/E) foam layer that surrounds the at least one conductor. The C/E foam layer is adapted to maintain its compressibility and expandability over a temperature range between −65° C. and 260° C., and a pressure range of between 0 and 1 atmosphere. The apparatus also includes a tape layer applied to the compressible foam layer so that it surrounds and axially and/or radially compresses the C/E foam layer. The apparatus further includes a protective outer jacket surrounding the tape layer. When a damaging force forms a localized breach in the protective outer jacket and the tape layer, a corresponding portion of the C/E foam layer axially and/or radially expands into the localized breach to form a localized self-healed region corresponding in size and location to the localized breach.

Another aspect of the present invention is a method of forming a self-healing cable. The method includes providing at least one conductor and surrounding the conductor with a radially compressible/expandable (C/E) foam layer. The method also includes providing an axial compressive force and/or a radially compressive force that axially and/or radially compresses the C/E layer to create an opposing axially and/or radially expansive force(s) in the C/E layer. The method also includes providing an outer jacket over the axially and/or radially compressed C/E layer, so that when the outer jacket is locally breached in a manner that locally removes the axially and/or radially compressive forces, the axially and/or radially expansive force(s) causes the C/E layer to expand into the breach to form a self-healed region that corresponds in size and location to the breach.

Another aspect of the invention involves incorporating the self-healing cable apparatus into a structure or device such as an aircraft or spacecraft that is capable of subjecting the self-healing cable to a damaging force.

The various elements depicted in the drawing are merely representational and are not necessarily drawn to scale. Certain sections thereof may be exaggerated, while others may be minimized. The drawing is intended to illustrate an example embodiment of the invention that can be understood and appropriately carried out by those of ordinary skill in the art.

DETAILED DESCRIPTION OF INVENTION

The present invention addresses the problem of repairing damage (e.g., wear, abrasion, chafing, puncture, slicing, heating, etc.) to various types of self-healing cables used in extreme environments by providing the self-healing cable with an adaptive covering that allows the self-healing cable to self-heal when damaged. The self-healing cable of the present invention serves to reduce the susceptibility to damage after installation, for instance, by employing an adaptive cover that protects the self-healing cable's core. Unlike prior art self-healing cables, the self-healing cable of the present invention is adapted to operate in extreme environments and use conventional self-healing cable manufacturing techniques.

The term "extreme environment" as used herein means an environment that experiences a wide range of values for one or more environmental characteristic (e.g., temperature, pressure, humidity, acceleration (vibration), etc.).

The self-healing cable of the present invention is configured to satisfy some or all of the requirements (preferably, as many as possible) of U.S. Military Specification No. 22759, which for convenience are listed in the following table:

| U.S. Military Specification No. 22759 | |
| --- | --- |
| Temperature rating | 200° C. (392° F.) maximum conductor temperature. |
| Voltage rating | 600 volts (rms) at sea level. |
| Spark test of primary insulation | Not required |
| Impulse dielectric test | 6.5 kilovolts (peak), 100 percent test. |
| Insulation resistance | 5,000 megohms for 1000 ft (min). |
| Wrap test | Mandrel test required - no cracking. Dielectric test after mandrel wrap, 2500 volt (rms), 60 Hz |
| Blocking | 260 ± 2° C. (500 ± 3.6° F.). |
| Shrinkage | 0.125 inch max at 200 ± 2° C. (392 ± 3.6° F.). |
| Wicking | Size 22 through 12 - Procedure II; 2.0 percent (max) weight increase, 0.750 inch (max) dye travel. Size 10 through 0000 - No requirement. |
| Low temperature (cold bend) | Bend temperature −65 ± 2° C. (−85 ± 3.6° F.). Dielectric test, 2500 volts (rms), 60 Hz. |
| Thermal shock | Oven temperature, 200 ± 2° C. (392 ± 3.6° F.). Max change in measurement - Sizes 22 through 12 - 0.060 inch. Sizes 10 through 8 - 0.100 inch. |

-continued

| U.S. Military Specification No. 22759 | |
|---|---|
| | Sizes 6 through 0000 - 0.125 inch. |
| Flammability | Post-flame dielectric test required, 600 volts (rms), 60 Hz |
| Life cycle | Oven temperature 313 ± 2° C. (595.4 ± 3.6° F.). |
| | Dielectric test, 2500 volts (rms), 60 Hz |
| Dielectric test after immersion | 2500 volts (rms), 60 Hz. |
| Humidity resistance | 5,000 megohms for 1000 ft, min insulation resistance after humidity exposure |
| Surface resistance | Sizes 22 through 12 - 500 megohm-inches (min), initial and final readings. |
| | Sizes 10 through 0000 - No requirement. |
| Smoke: | 313° C. (595.4° F.). |
| Acid resistance | Required. Dielectric test, 2500 volts (rms), 60 Hz. |
| Color | In accordance with MIL-STD-104, Class 1; white preferred. |
| Color striping or banding durability | 50 cycles (100 strokes) (min), 125 grams weight. |
| Identification durability | 50 cycles (100 strokes) (min), 125 grams weight. |

In the present invention, the term "conductor" is used broadly and includes electrical conductors (e.g., self-healing cables, metal wiring, etc.), optical conductors (e.g., optical fibers, optical fiber self-healing cables, optical waveguides, etc.), fluid (i.e., gas, liquid, vacuum) conductors (e.g., transfer tubing), and the like.

In addition, the term "adaptive cover" is used to define some or all of those parts of the self-healing cable other than the conductor that contribute to the self-healing properties of the self-healing cable, and that includes at least one reactive layer. Here, the "reactive layer" is one or more layers that respond to a damaging force by changing form in a manner protects the conductor and thereby provides "self-healing." Further, the "reactive layer" is one that is adapted to provide self-healing in extreme environments, rather than simply in select environments.

Further, the term "self-healing cable" is used in the broad sense to describe a conductor in combination with the adaptive cover of the present invention, as described below.

Also, the term "damage" is used herein in the general sense and can be any type of harm to the self-healing cable caused by a force, referred to herein as a "damaging force," of sufficient nature and strength to put the self-healing cable's normal operation at risk. Examples of a damaging force include such physical actions as wearing, abrasion, chafing, puncturing, slicing, tearing, melting, cracking, bending, electrical arcing, radiation, hydrolysis, etc., acting either alone or in combination.

Self-Healing Cable Apparatus

Figure 1:
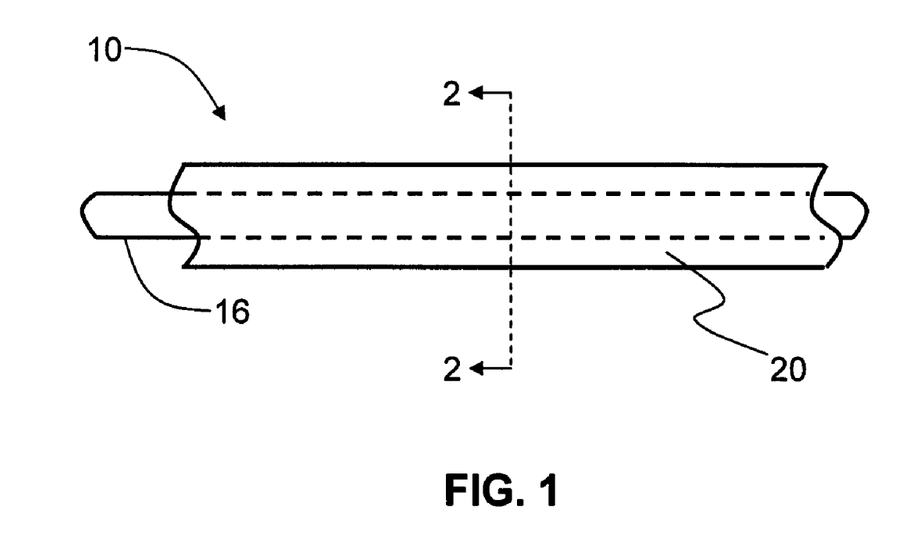
FIG. 1 is a cut-away partial side view of an example self-healing cable according to the present invention, showing a central conductor surrounded by an adaptive cover.
Figure 2:
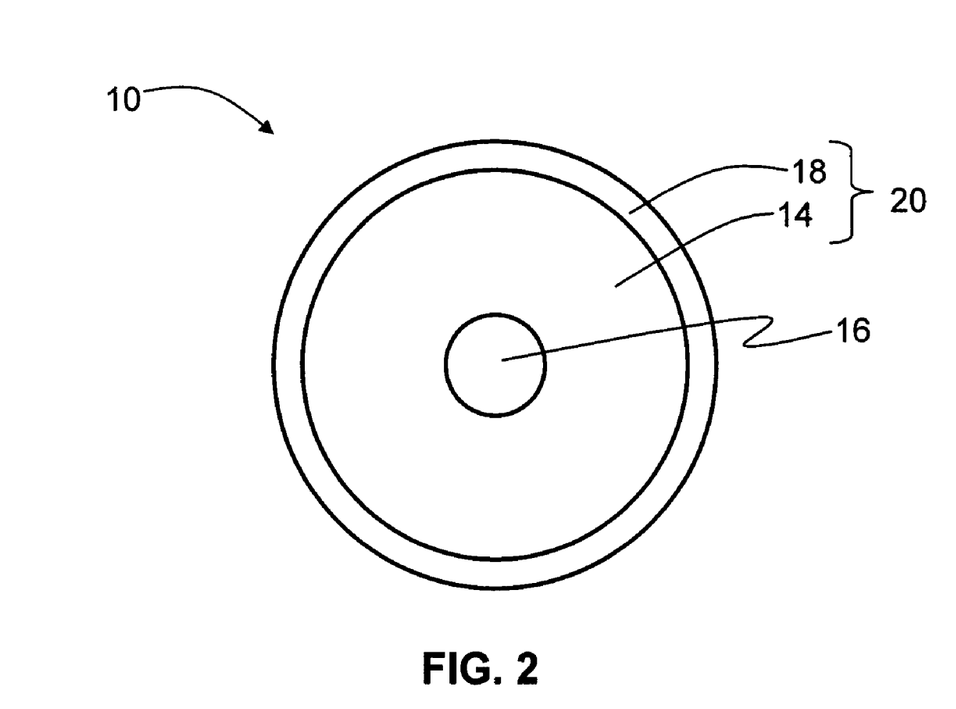
FIG. 2 is cross-sectional view of the self-healing cable of FIG. 1 as taken along the line 2-2, showing a generalized conductor surrounded by the adapted cover.

FIG. 1 is a side view of an example self-healing cable 10 according to the present invention. FIG. 2 is face-on view of self-healing cable 10 as viewed in direction of arrows 2-2 in FIG. 1. Self-healing cable 10 includes a generic example of a conductor 16 surrounded by an adaptive cover 20 that engages the conductor. In an example embodiment, adaptive cover 20 includes at least one reactive layer 14 (discussed below) that comprises a material that protects conductor 16 in response to a damaging force, and a protective cover 18 that surrounds the reactive layer.

The present invention is not limited to centralized conductor configurations. For example, FIG. 3 is a cross-sectional view of an example embodiment of self-healing cable 10 similar to FIG. 2, wherein conductor 16 has two coaxial conductors, an inner conductor 161 and an outer conductor 160, with an insulating layer 22 therebetween, such as found in standard coaxial self-healing cable.

Figure 3:
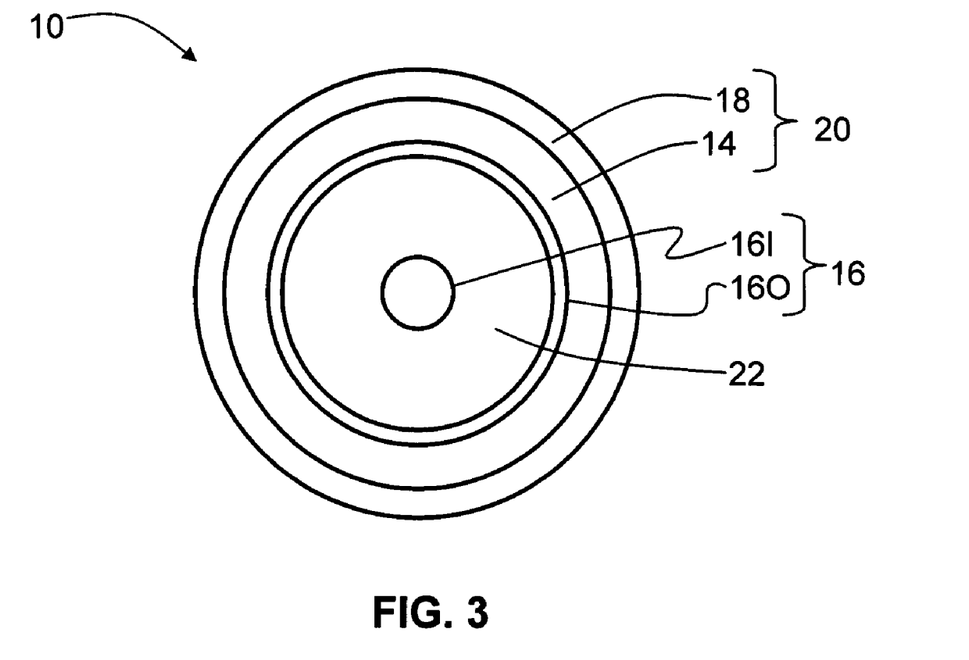
FIG. 3 is a cross-sectional view similar to FIG. 2, but illustrating an example embodiment wherein the conductor has two coaxial conductors, such as found in standard coaxial self-healing cable.
Figure 4:
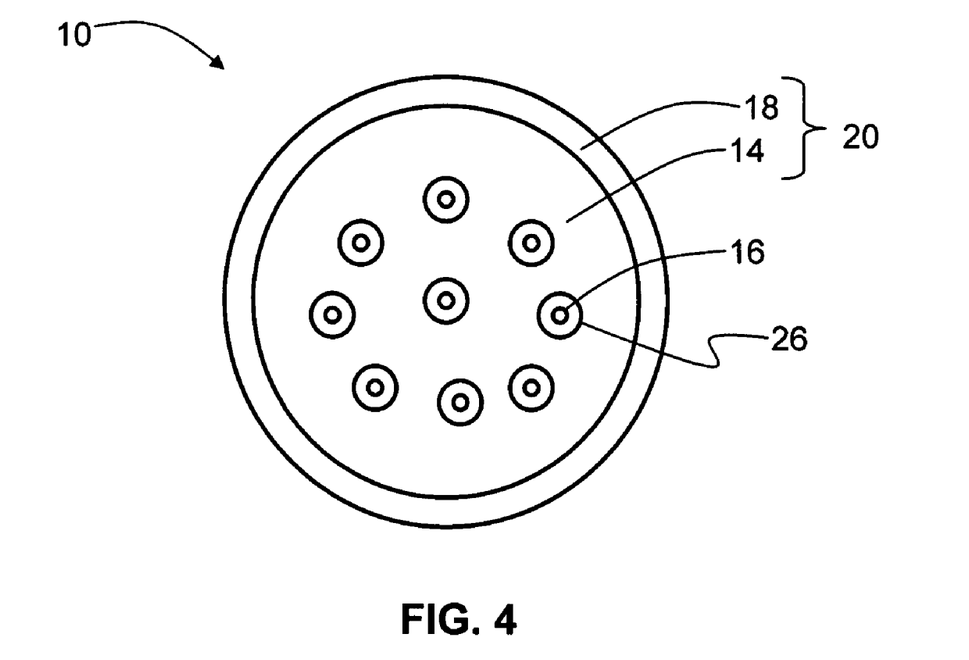
FIG. 4 is a cross-sectional view similar to that of FIGS. 2 and 3, but illustrating an embodiment wherein the self-healing cable includes a number of conductors each having a surrounding insulating layer.

FIG. 4 is a cross-sectional view of another example embodiment of self-healing cable 10 similar to FIGS. 2 and 3, wherein the self-healing cable includes a number conductors 16 having an insulating layer 26 surrounding the conductor.

Figure 5:
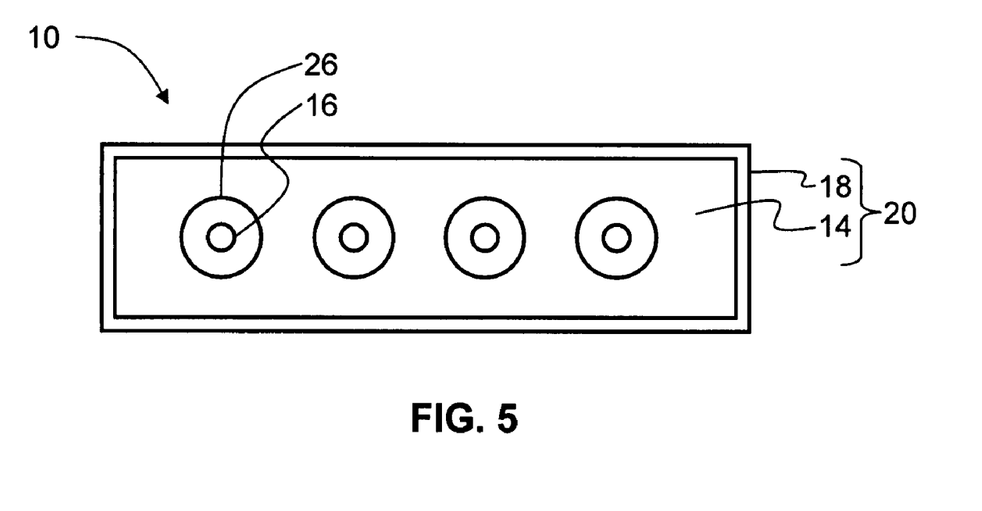
FIG. 5 is a cross-sectional view similar to FIG. 4, but illustrating an embodiment wherein the self-healing cable is a ribbonized self-healing cable bundle having a square cross-section.

FIG. 5 is a cross-sectional view of another example embodiment of self-healing cable 10 similar to FIG. 4, but wherein the self-healing cable is a ribbonized self-healing cable bundle having a square cross-section.

In an example embodiment, adaptive cover 20 is adapted to locally react to damage to the self-healing cable in a manner that locally protects the conductor in and around the area of damage so that the self-healing cable can operate safely, preferably at or near its normal operating conditions even in an extreme environment. In an example embodiment, adaptive covering 20 locally changes its properties to inhibit further damage to the self-healing cable, particularly conductor 16. The self-healing is kept local (i.e., substantially limited to the region of damage) by the structure of the self-healing cable, as explained below.

Certain cabling applications have requirements for ease of installation and routing of self-healing cables through complex geometries. Such requirements often dictate that the self-healing cable be flexible during the installation process. This prohibits the use of very hard, durable coverings. However, after installation, the conductors can be subject to a damaging force by virtue of ordinary use or through extraordinary circumstances (e.g., an accident).

In one example embodiment of self-healing cable 10, adaptive covering 20 extends substantially over an entire length of the self-healing cable, so that the self-healing property of the self-healing cable is present over most if not all of the self-healing cable's length. In another example embodiment, adaptive covering extends over one or more portions of the self-healing cable's length. This latter example embodiment is suitable, for example, in situations where the self-healing cable 10 will experience damaging forces at known locations when the self-healing cable is installed in a structure, e.g., such as threading the self-healing cable through regularly spaced plates or bulkheads.

Commercial Manufacturability of the Self-Healing Cable

Figure 6:
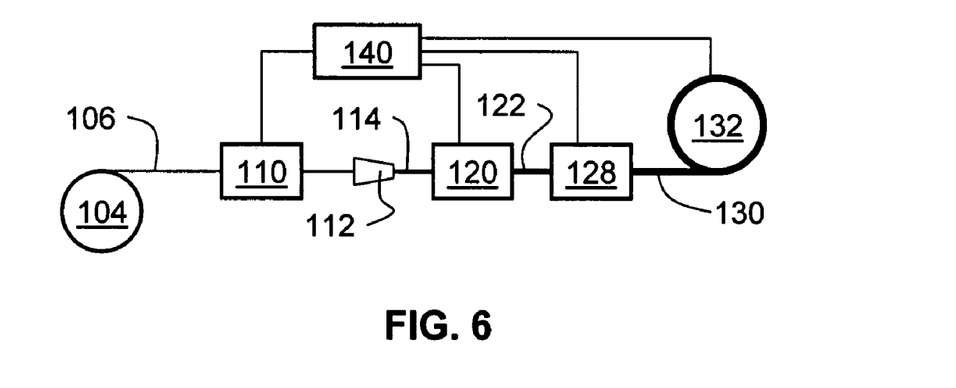
FIG. 6 is a schematic diagram of an example self-healing cable manufacturing tool used to make commercial cabling and that is suitable for fabricating the self-healing cable of the present invention.

As mentioned above, an advantage of self-healing cable 10 of the present invention is that it can be manufactured using commercially available self-healing cable manufacturing tools. FIG. 6 is a schematic diagram of an example self-healing cable manufacturing tool 100 used to make commercial cabling. An example tool 100 is available from Eagle Co., No. 252, Huzhou Lu, Jiaozhou City, Qingdao, China, and described at www.eagleco.en.alibaba.com. Tool 100 includes a conductor spool 104 that stores a wire 106 (which is one form of conductor 16). Wire 106 is feed into a braiding apparatus 110, which forms a braided layer (usually, other wires) around central wire 106. A compression cone 112 is used to compress the braided layers around wire 106, thereby forming a braided wire 114. The braided wire proceeds to a tape-wrap apparatus 120, which wraps an insulating tape around the braided conductor to form a tape-wrapped braided wire 122. The tape-wrapped braided wire 122 then proceeds to a coating apparatus 128, which coats the tape-wrapped braided conductor with a extruded protective outer coating, such as TEFLON, to form the final self-healing cable 130. A motorized take-up spool 132 receives and stores self-healing cable 120. Tool 100 is controlled by a controller (e.g., a computer) 140 that is operably connected to braiding apparatus 110, tape-wrap apparatus 120, coating apparatus 128 and take-up spool 132, and that controls the overall operation of the tool.

Preferred Embodiment of the Self-Healing Cable

Figure 7:
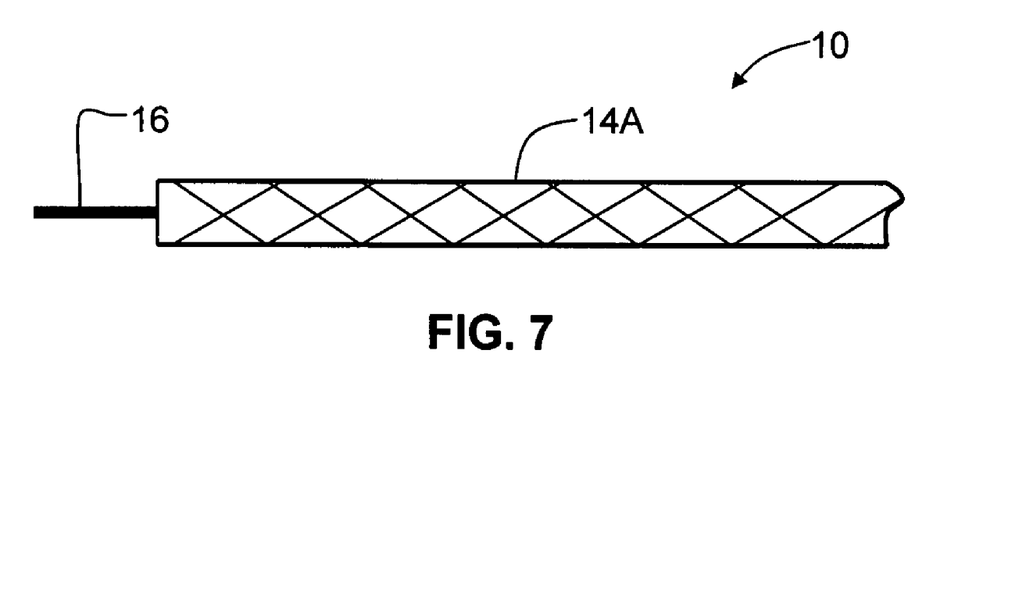
FIG. 7 is a schematic side view of an example embodiment of the self-healing cable of the present invention in a first stage of fabrication using tool the tool of FIG. 6, wherein a radially compressive/expansive (C/E) foam layer is formed around the conductor via a braiding operation.

FIG. 7 is a schematic side view of an example embodiment of self-healing cable 10 of the present invention in a first stage of fabrication. In an example embodiment, tool 100 is used, wherein conductor 16 is stored on spool 104. In FIG. 7, a first reactive sub-layer 14A that is or otherwise includes a radially and/or axially compressible/expandable (C/E) foam is provided to surround conductor 16, e.g., wrapped around the conductor using braiding apparatus 110 of tool 100. Sub-layer 14A is thus referred to hereinafter as "C/E foam layer 14A." C/E foam layer 14A is insulating and of the type that does not significantly change its properties in extreme environments. In an example embodiment, C/E foam layer exceeds, meets, or comes close to meeting current military performance specifications, such as the above-described MIL-W-22759 specifications or the equivalent or updated version(s) thereof.

In an example embodiment, C/E foam layer 14A is or includes a fluoropolymers, such as viscoelastic polytetrafluoroethylene (PTFE) foam (PTFE is better known under its trademarked name TEFLON, a trademark of Dupont Corporation). Such foam is available from American Micro Industries, Inc., and comes in sheets from 0.125 inches thick to 2.0 inches thick, and have a thermal range of −240° C. to 205° C. (−400° F. to +400° F.). Other example fluoropolymers for C/E foam layer 14A are PFA and FEF. Other suitable materials for C/E foam layer 14A include viscoelastic polyurethanes and aromatic high-temperature polymers, such as PI, PPO, PPS (Polyphenylene sulphide), poly-etheretherketone (PEEK). One particular viscoelastic polyurethane suitable for use as a material for C/E foam layer 14 is the polyurethane-based memory foam TEMPUR, a trademark of Tempur-Pedic, Inc., of Lexington, Ky. Of the above-identified materials, PEEK, PPS and PTFE are the preferred materials based on U.S. Military Specification No. 22759 as set forth above.

Figure 8:
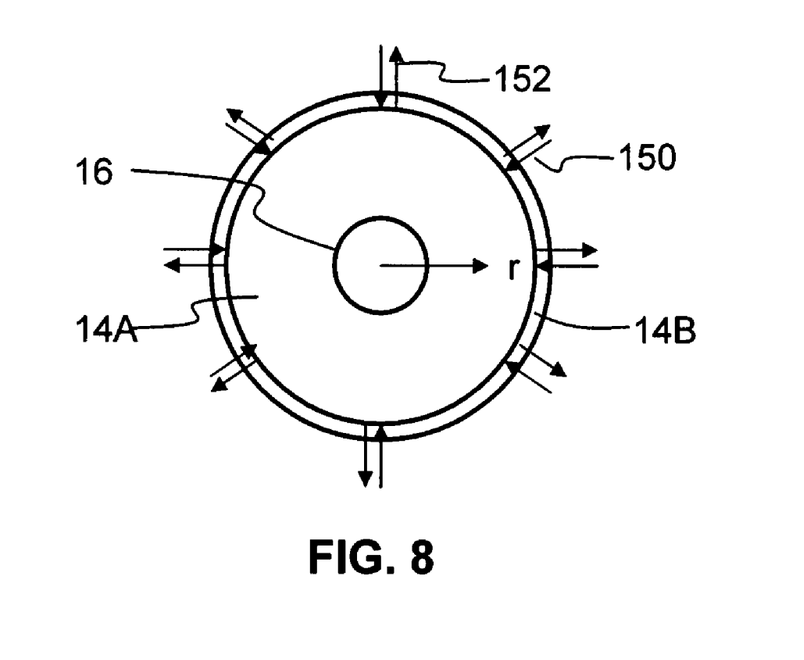
FIG. 8 is an end-on view of the self-healing cable of FIG. 8, illustrating the radial direction r and the radial compressive and expansive force components associated with the compressive/expansive (C/E) layer.

FIG. 8 is an end-on view of self-healing cable 10 of FIG. 7, illustrating the radial direction r. With reference to FIG. 8, C/E foam layer 14A is radially compressible when subject to a radial compressive force component 150, as illustrated by radially inward-pointing arrows. Here, the compressive force 150 is provided by an outer layer 14B, as described below. In an example embodiment, C/E foam layer is axially and/or radially compressible, and is preferably both axially and radially compressible. Here, only the radial compressive force component 150 is shown by way of illustration. The radial compression of C/E foam layer 14A is such that energy is stored in the layer and results in a radial expansive force component 152, illustrated by radially outward-pointing arrows. Thus, compressive force 150 needs to be continually applied to the C/E layer to maintain the layer in a compressed state (i.e., to counterbalance expansive force component 152). Release of compressive force 150 allows C/E foam layer 14A to expand back to (or nearly to) its uncompressed state via an expansion force component 152. In an example embodiment of the first fabrication state illustrated in FIG. 7, C/E foam layer 14A is substantially uncompressed or only partially radially compressed by the braiding process.

Once C/E foam layer 14A is applied to conductor 16, it may need time to cure, which determines the rate at which self-healing cable 10 moves through tool 100. After self-healing cable 10 passes through braiding apparatus 110, the self-healing cable passes through compression cone 112, which further radially compresses C/E layer 14A, but preferably not to the point where it is fully compressed.

Figure 9:
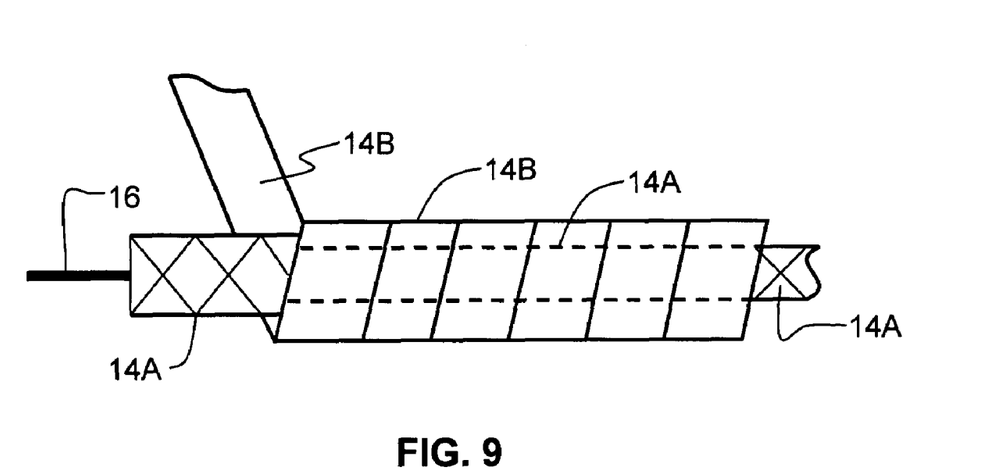
FIG. 9 is a schematic side view of an example embodiment of the self-healing cable of the present invention in a second stage of fabrication using the tool of FIG. 6, wherein a tape layer is used to axially and/or radially compress the underlying C/E foam layer.

FIG. 9 is a schematic side view of self-healing cable 10 in a second stage of fabrication, wherein a second sub-layer 14B of reactive layer 14 is formed by tape wrap apparatus 120 of tool 100 in a manner that radially and axially compresses C/E foam layer 14A completely or nearly completely. Sub-layer 14B is thus referred to hereinafter as "tape layer 14B." In a preferred example embodiment, tape layer 14B is or includes TEFLON tape, and tape wrap apparatus 110 is modified to accommodate such tape if necessary. Tape layer 14B is strong enough to provide the necessary compressive forces, yet is thin enough so that it allows for C/E foam layer 14A to reside relatively close to self-healing cable outer jacket 18 to effectuate the self-healing process very soon after the self-healing cable integrity is breached.

Figure 10A:
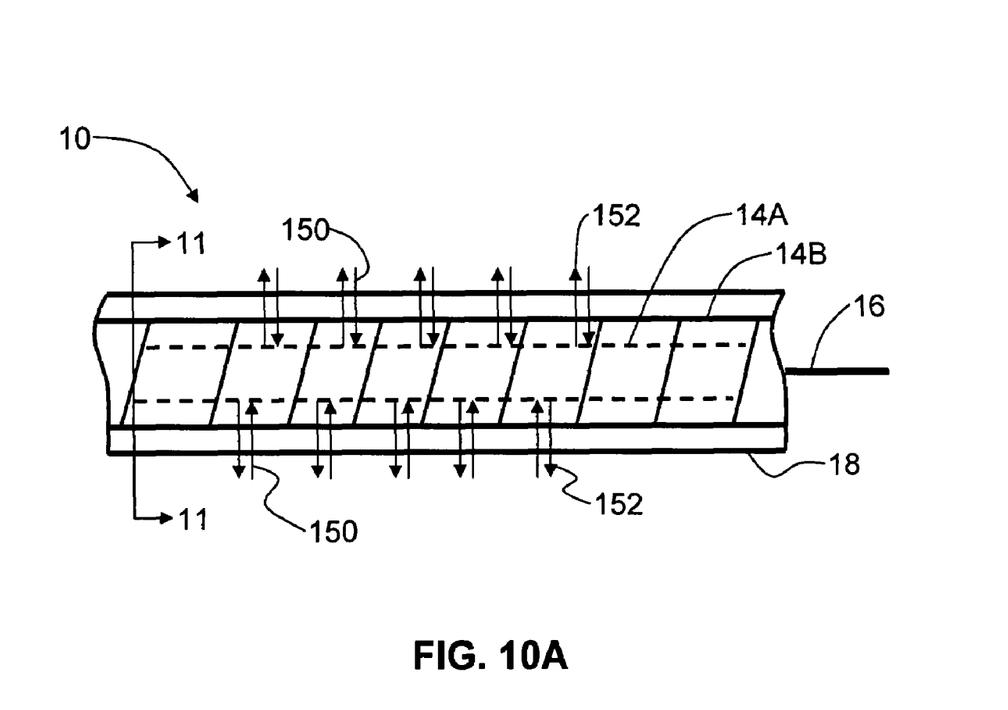
FIG. 10A is a schematic cut-away side view of an example embodiment of the self-healing cable of the present invention in a third and final stage of fabrication using the tool of FIG. 6, showing the radial compressive and expansive force components associated with the compressive/expansive (C/E) layer that exist along the length of the self-healing cable.
Figure 10B:
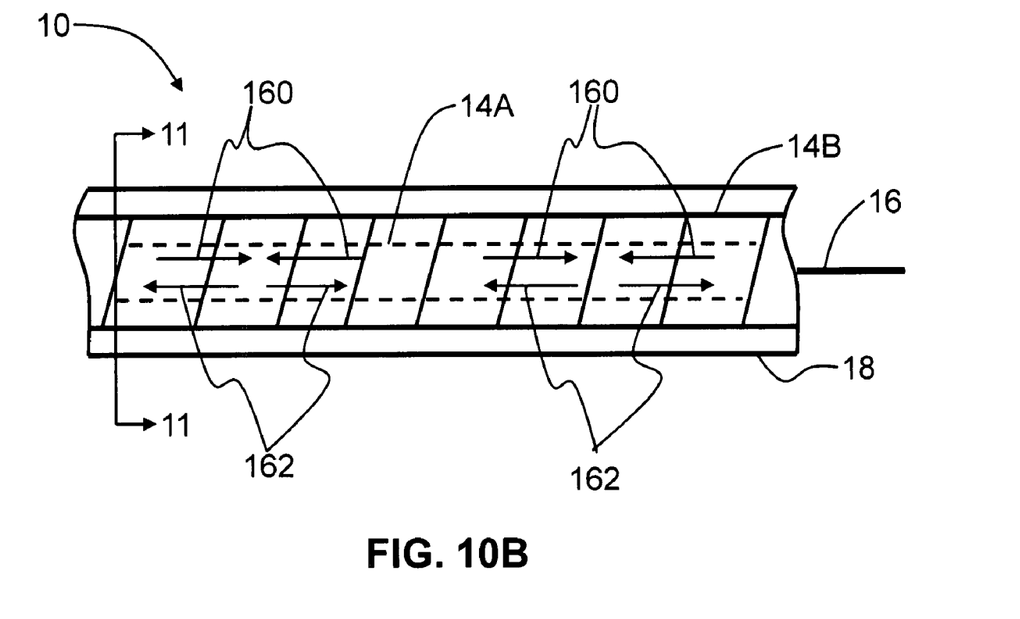
FIG. 10B is similar to FIG. 10A but shows the axial compressive and expansive force components associated with the compressive/expansive (C/E) layer that exist along the length of the self-healing cable.

FIGS. 10A and 10B are schematic side views of a portion of self-healing cable 10 in a third and final stage of fabrication, wherein the tape-wrapped self-healing cable of FIG. 9 is sent to coating apparatus 128 of tool 100, which coats the tape-wrapped self-healing cable with an extruded protective outer coating (jacket) 18. In an example embodiment, the material used for outer jacket 18 is TEFLON.

FIG. 10A shows the equilibrium between the radial compression and expansive forces 150 and 152 due to the compression of C/E foam layer 14A by tape layer 14B (as well as from outer coating 18), and the expansion force associated with the potential energy stored in C/E foam layer. The potential energy is released when the compressive force is released.

Figure 11:
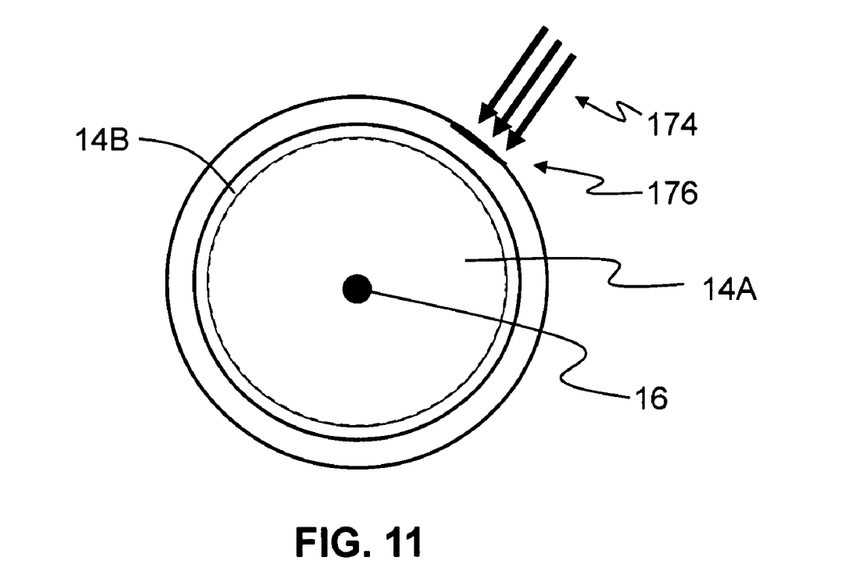
FIG. 11 is a cross-sectional view of the self-healing cable of FIGS. 10A and 10B as taken along the line 11-11, and showing an external damaging force acting on the self-healing cable over a limited area (region)

FIG. 10B shows the equilibrium between the axial compression and expansive forces 160 and 162 due to the axial compression of C/E foam layer 14A by tape layer 14B (as well as from outer coating 18), and the axial expansion force associated with the potential energy stored in C/E foam layer. The potential energy is released when the compressive force is released. Axially compressive force 160 is created, for example, by applying tape layer 14B to C/E foam layer 14A in a manner that pulls the underlying C/E foam layer in the axial direction. This can be done for example, by bringing the tape layer 14B into contact with C/E foam layer 14A and then both radially and axially tightening the tape layer while winding the tape layer around the underlying C/E foam layer. In a preferred example embodiment, tape layer 14B is wound around C/E foam layer 14A in a manner that axially compresses the C/E foam layer in both axial directions so that each point in the C/E foam layer has a balancing expansive force that is axially directed in opposite directions—much like compressing a spring from both sides. FIG. 11 is a cross-sectional view of the final self-healing cable 10 of FIGS. 10A and 10B taken along the line 12-12, and showing an external damaging force component 174 acting on the self-healing cable over a limited area (region) 176 (shown as a bold line for the sake of illustration).

Figure 12:
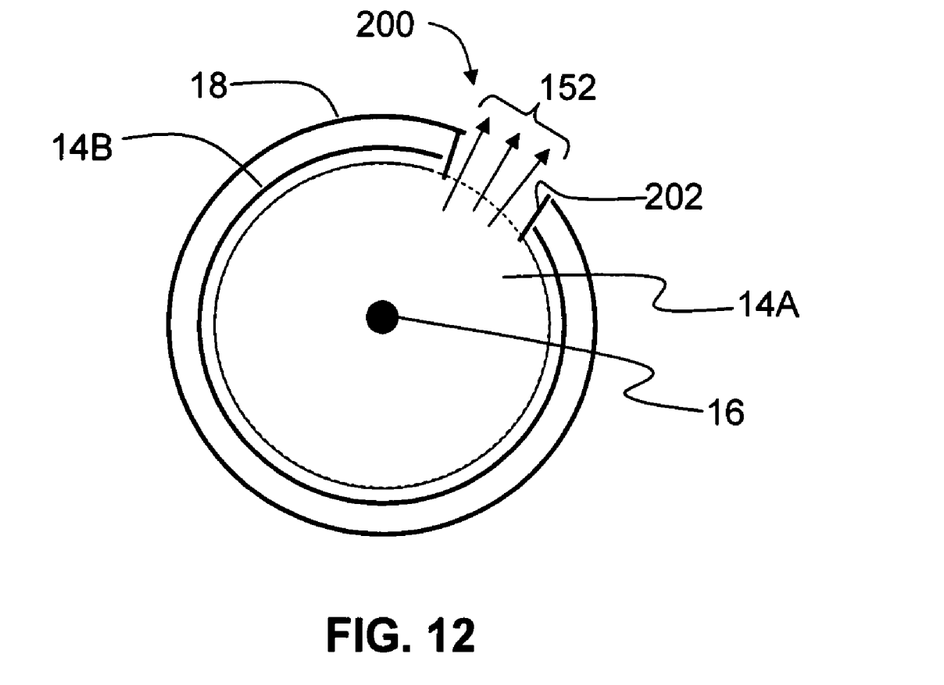
FIG. 12 is a cross-section view of the self-healing cable similar to that of FIG. 11, but illustrating a breach formed in the self-healing cable by the external force, and showing the localize release of the radial expansive force component in the C/E layer.

FIG. 12 is a cross-section view of self-healing cable 10 similar to that of FIG. 11, but illustrating the self-healing cable having a breach 200 formed in outer jacket 18 and tape layer 14B due to damaging force component 174. Breach 200 has an inner edge 202 formed by outer jacket 18 and tape layer 14B. FIG. 12 also shows the localized radial expansive force component 152 of C/E foam layer 14A that is "released" when the counterbalancing compressive force 150 is removed. The self-healing cable of FIG. 12 is shown just prior to C/E layer 14A reacting to expansion force component 152 for the sake of illustration.

Figure 13:
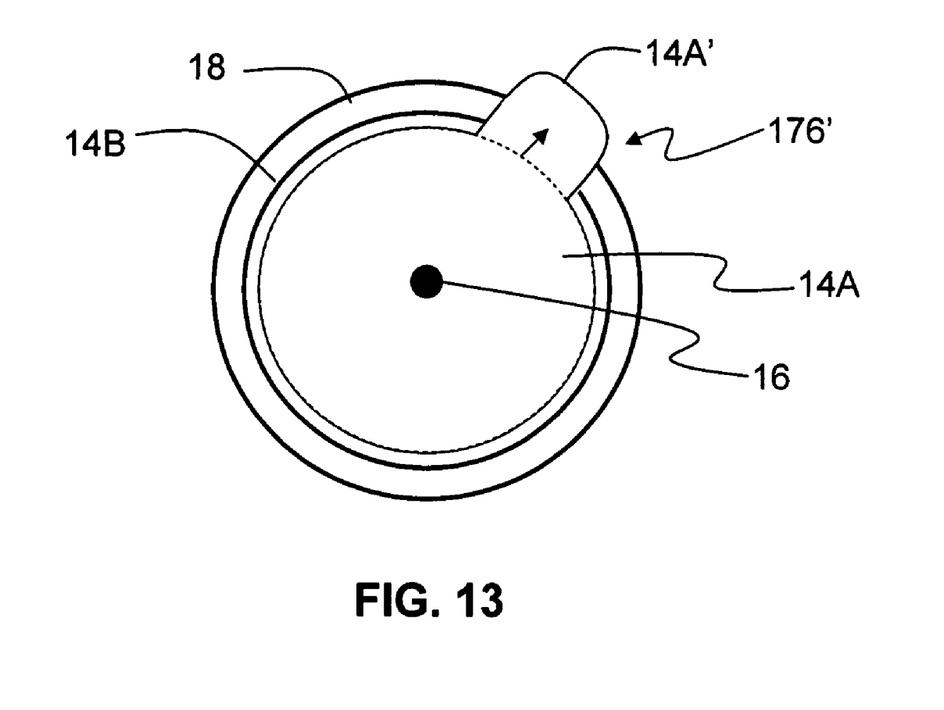
FIG. 13 is similar to FIG. 12, but showing the local expansion of a portion of C/E foam layer so that it protrudes into the breach to form a self-healed region.

FIG. 13 is similar to FIG. 12, but shows the local expansion of a portion 14A' of C/E foam layer 14A caused by expansive force component 152 that causes portion 14A' to protrude into and through breach 200. This causes region 156 to become a self-healed region 176'. Edge 202 of breach 200 serves to keep self-healed region 176' localized, since the undamaged portion of these layers provide a compressive force on the remainder of C/E foam layer 14A. This also allows for multiple self-healed regions 176' to be formed in self-healing cable 10, wherein one self-healing region does not substantially affect another such region. In the case where one self-healing region is close enough to interact with an adjacent self-healed region, the two self-healed regions may coalesce to form a single self-healed region.

Figure 14:
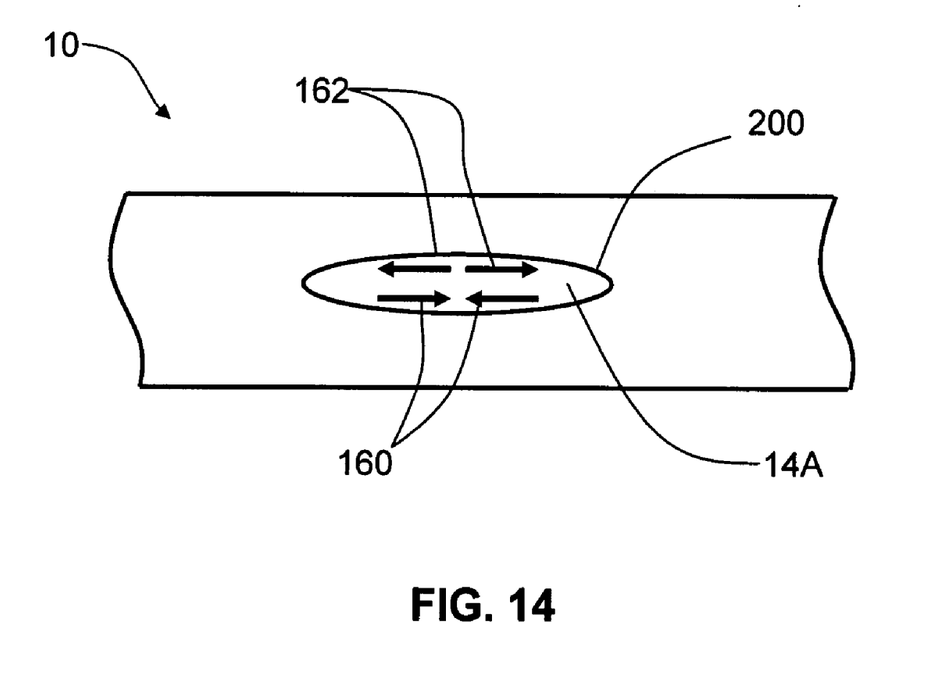
FIG. 14 is a schematic side view of the self-healing cable of the present invention analogous to FIG. 12 that shows the breach formed by the damaging force along with the axial compressive and expansive forces that exist just prior to the formation of the breach.
Figure 15:
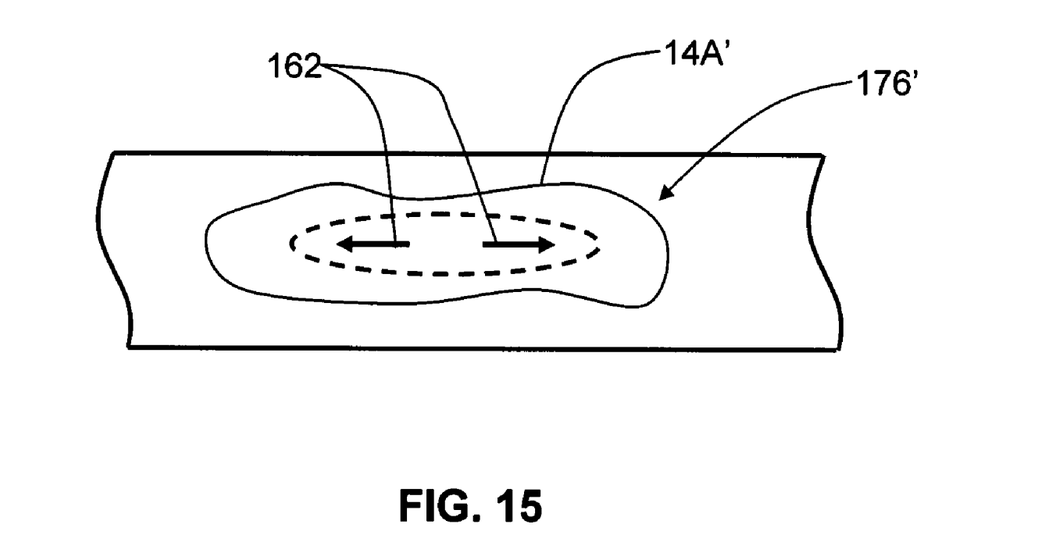
FIG. 15 is a schematic side view similar to FIG. 14, but showing the localized axial and radial expansion of the C/E foam layer so that it protrudes into the breach to form a self-healed region.

FIG. 14 is a schematic side view of a section of self-healing cable 10 showing breach 200 immediately after it is formed in the cable and shown just prior to the exposed C/E layer 14A reacting to axial expansive force components 162. The balance between the axial compression and expansive force components 160 and 162 are shown. FIG. 15 is similar to FIG. 14 and shows how the axial expansive force components 162 act to cause a portion 14A' of C/E layer 14A to axially expand to fill and cover breach 200 and form self-healed region 176'. In a preferred embodiment, both radial and axial expansive forces 152 and 162 act together to fill and cover breach 200. For a given type and orientation of breach 200, however, one these two expansive forces is likely to play a greater role than the other.

Structure with Incorporated Self-Healing Cable

Figure 16:
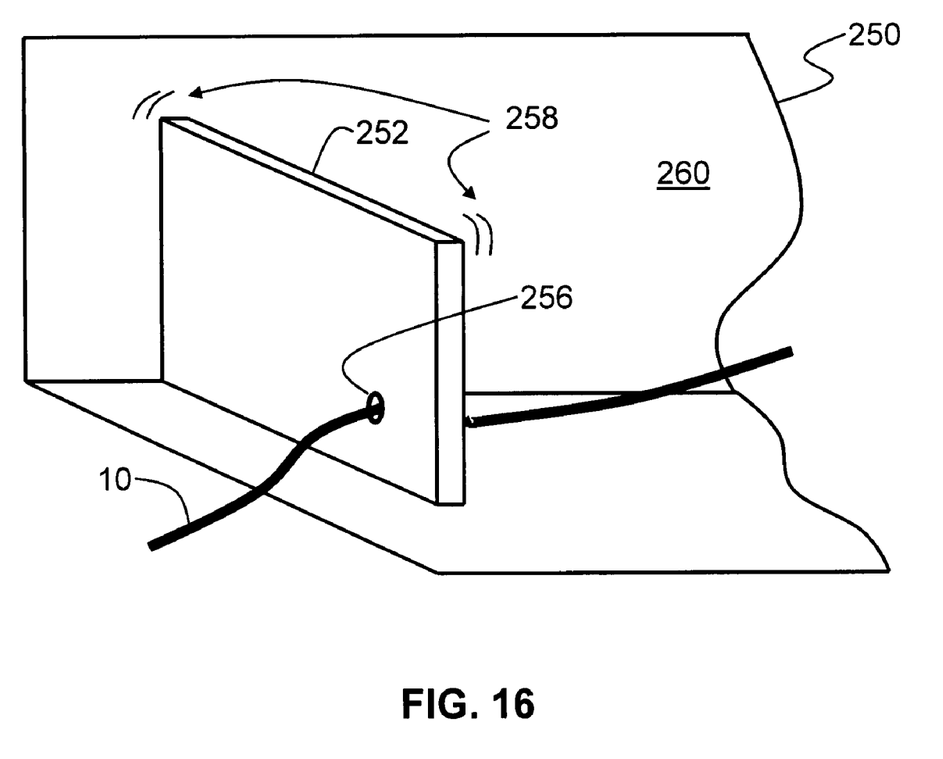
FIG. 16 is a perspective view of a generic structure having a plate with an aperture formed therein and a self-healing cable of the present invention passing through the aperture, illustrating how a structure can subject a self-healing cable to a localized damaging force.

FIG. 16 is a perspective partial view of a structure 250 that includes a plate 252 with an aperture 256 formed therethrough. Self-healing cable 10 of the present invention passes through aperture 256. Structure 250 is a generic example of an application wherein the self-healing cable of the present invention is incorporated therein and interacts with the structure in a way that subjects the self-healing cable to a localized damaging force. For example, structure 250 can be an airplane fuselage and plate 252 can be an airplane bulkhead that vibrates because of normal aircraft operation. Self-healing cable 10 in this example may be a control self-healing cable that operably connects controls in the airplane cockpit to another part of the plane, such as the wing flaps or tail rudder. Hash marks 258 in FIG. 2 illustrate plate movement (e.g., vibration).

Structure 250 has an associated ambient environment 260 in which self-healing cable 10 resides. Ambient environment 260 is capable of extremes of at least one of environmental characteristic, such temperature, pressure, humidity, acceleration (including vibration, which is considered a form of micro-acceleration), etc. In an example embodiment, environment 260 is that associated with aerospace and aeronautical applications, including spacecraft (including satellites and space-borne scientific instrumentation), aircraft, rockets, missiles and the like.

Damage to self-healing cable 10 at the location of plate aperture 256 due to a damaging force in the form of plate vibration, for example, will ultimately cause a reaction in adaptive cover 20. The reaction results in the formation of a localized self-healed region (discussed below) in the self-healing cable that reduces the effect of the damage on the self-healing cable (and particularly the conductor) at the location where the damaging force occurs.

Because the self-healed region is local to the area of damage, the rest of the self-healing cable remains unaffected. For example, for a flexible self-healing cable 10, the unaffected parts of the self-healing cable remain flexible to facilitate such things as movement of the self-healing cable due to movement of control surfaces, or removal of the self-healing cable. Self-healing cables that do not remain flexible in non-damaged locations limit self-healing cable movement and tend to be difficult to remove and replace.

In an example embodiment, adaptive cover 20 is designed to provide a self-healed region of a desired relative size so that it protects an appropriate portion of self-healing cable 10 relative to the damaged area and/or where the damaging force is present. The self-healing nature of self-healing cable 10 eliminates the need for bulkhead grommets and other self-healing cable-protecting devices, and also contributes greatly to the safety of a wide variety of systems having self-healing cables that, when damaged, present a safety hazard.

In the case where conductor 16 is electrically conductive, the material(s) selected for the reactive layer of adaptive cover 20 are preferably selected to provide suitable electrical insulation for the conductor to prevent shorting, arcing, etc., when the self-healing cable is damaged and then self-healed. In an embodiment wherein the reactive layer includes multiple sub-layers, one, some or all of the layers may be electrically insulating.

In the case where conductor 16 is hydraulically or pneumatically conductive, the material(s) selected for reactive layer 14 of adaptive cover 20 preferably include those that can provide suitable sealing of the conductor to prevent leakage when the self-healing cable is damaged and then self-healed. Thus, in an embodiment wherein the reactive layer 14 includes multiple sub-layers, one, some or all of the layers may be sealant layers.

Accordingly, it will be apparent to those skilled in the art that various modifications and variations can be made to the present invention without departing from the spirit and scope of the invention. Thus, it is intended that the present invention cover the modifications and variations of this invention within the scope of the appended claims and their equivalents.

What is claimed is:

1. A self-healing cable apparatus, comprising:
   at least one conductor;
   an axially and radially compressible/expandable (C/E) foam layer surrounding the at least one conductor, said C/E foam layer adapted to maintain its compressibility and expandability over a temperature range between −65 and 260 degrees C., and a pressure range of between 0 and 1 atmosphere;
   a tape layer applied to the compressible foam layer so that it surrounds and axially and radially compresses the C/E foam layer so that the C/E foam layer includes substantial axial and radial expansive force components that are counterbalanced by substantial axial and radial compressive force components provided by the tape layer;
   a protective outer jacket surrounding the tape layer; and wherein, when a damaging force forms a localized breach in the protective outer jacket and the tape layer, a corresponding portion of the C/E foam layer axially and radially expands into said localized breach and beyond the protective outer jacket due to uncounterbalanced axial and radial expansive force components in the C/E foam layer, thereby forming a localized self-healed region in said localized breach.

2. The self-healing cable apparatus of claim 1, wherein the C/E foam layer is or includes a material selected from the group of materials comprising: polytetrafluoroethylene (PTFE), polyphenylene sulphide (PPS), poly-etheretherketone (PEEK), and viscoelastic polyurethane.

3. The self-healing cable apparatus of claim 2, wherein the tape layer is or includes PTFE.

4. The self-healing cable apparatus of claim 3, wherein the outer jacket is or includes PTFE.

5. The self-healing cable apparatus of claim 1, wherein the at least one conductor consists of a single central conductor.

6. The self-healing cable apparatus of claim 1, wherein the at least one conductor is selected from the group of conductors comprising: an electrical conductor, an optical conductor, and a fluid conductor.

7. The self-healing cable apparatus of claim 1, wherein:
a) the conductor has a length;
b) wherein the C/E foam layer, the tape layer and the protective outer jacket constitute an adaptive covering; and
c) wherein the adaptive covering extends substantially over the entire length of the self-healing cable.

8. The self-healing cable apparatus of claim 1, wherein the tape layer is wrapped around the C/E foam layer in a manner that axially compresses the C/E foam layer in first and second axial directions.

9. The self-healing cable apparatus of claim 1 wherein the tape layer is spiral-wrapped around the CIE foam layer.

10. A self-healing cabling method, comprising:
providing the self-healing cable of claim 1; and
incorporating the self-healing cable into a structure capable of damaging the self-healing cable with a damaging force.

11. The apparatus of claim 1, wherein the tape layer is wound around the C/E foam layer so as to be axially tightened around the C/E foam layer.

12. A method of forming a self-healing cable having an outer jacket, comprising:
providing at least one conductor;
surrounding the at least one conductor with an axially and radially compressible/expandable (C/E) foam layer capable of expanding beyond the outer jacket;
providing substantial axial and radial compressive forces to axially and radially compress the C/E foam layer to create opposing substantial axial and radial expansive forces in the C/E foam layer; and
providing an outer jacket over the axially and/or radially compressed C/E foam layer, so that when the outer jacket is locally breached in a manner that locally removes the axial and radial compressive forces, the axial and radial expansive forces cause the C/E foam layer to locally expand into the breach to form a self-healed region in said breach and that extends beyond the outer jacket.

13. The method of claim 12, including braiding the C/E foam layer onto the conductor.

14. The method of claim 13, including tape-wrapping the C/E foam layer to provide the axial and radial compressive forces.

15. The method of claim 12, wherein the C/E foam layer is selected from the group of materials comprising: fluoropolymers, aromatic high-temperature polymers, polyurethanes and viscoelastic polyurethanes.

16. The method of claim 15, wherein the C/E foam layer comprises at least one of PTFE, PFA and FEP.

17. The method of claim 15, wherein the C/E foam layer comprises at least one of PI, PPO, PPS, and PEEK.

18. The method of claim 12, wherein the at least one conductor is selected from the group of conductors comprising: an electrical conductor, an optical conductor, and a fluid conductor.

19. The method of claim 12, further comprising:
winding the tape layer around the C/E foam layer and axially tightening the tape layer.

20. The method of claim 19, including performing said winding so as to provide the axial compressive force in both axial directions.

\* \* \* \* \*